UNITED STATES PATENT OFFICE.

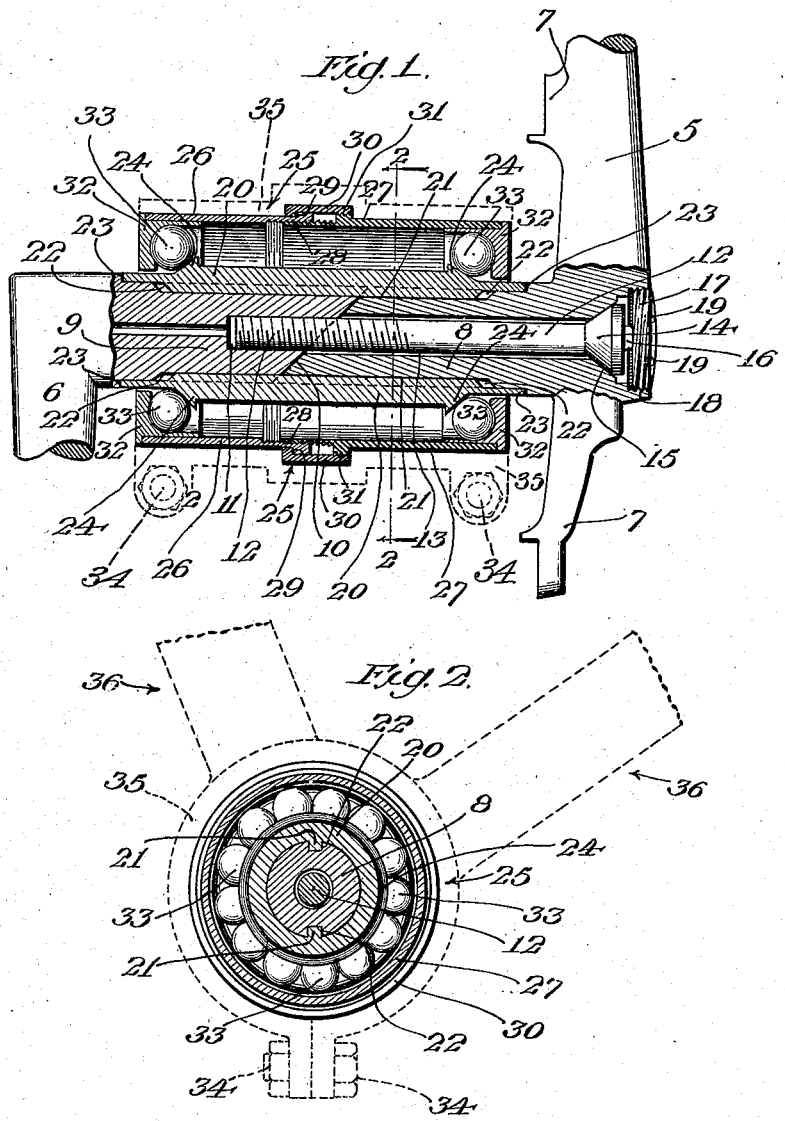

DWIGHT B. STEPHENSON, OF SIERRA MADRE, CALIFORNIA.

CRANK-HANGER.

No. 911,174.  Specification of Letters Patent.  Patented Feb. 2, 1909.

Application filed November 18, 1907. Serial No. 402,681.

*To all whom it may concern:*

Be it known that I, DWIGHT B. STEPHENSON, a citizen of the United States, residing at Sierra Madre, county of Los Angeles, State of California, have invented new and useful Improvements in Crank-Hangers, of which the following is a specification.

My invention relates to a crank hanger for bicycles and the like and the prime object thereof is to provide a hanger in which the two cranks may be securely fastened together in such a manner as to obviate all liability of the same becoming loosened from each other.

A further object is to provide an adjustable case for the hanger which completely incloses the bearings of the same, thus protecting them from dust and other foreign material which is instrumental in cutting the bearings.

A further object is to provide a construction which is simple in design and manufacture and which may be easily taken apart and reassembled.

I accomplish these objects by means of the device described herein and illustrated in the accompanying drawings in which:—

Figure 1, is a longitudinal section of my improved hanger. Fig. 2, is a cross section taken on lines 2—2 of Fig. 1.

Referring to the drawings 5 and 6 designate the cranks of a bicycle of usual construction, crank 5 being provided with arms 7 for the reception of a sprocket wheel (not shown). Cranks 5 and 6 are provided with shanks 8 and 9 which are adapted to abut against each other along a diagonal surface 10 at their ends and thus form a crank shaft which is divided near its center. Shank 9 is provided with a screw threaded bore 11 into which a bolt 12 is adapted to fit. Bolt 12 passes loosely through a bore 13 in shank 8 and is provided with a conical head 14 which fits into a similarly shaped countersink 15 on the outer end of bore 13. Bolt 14 is provided with a squared portion 16 on its outer end which affords means whereby the bolt may be turned. A cap 17 is adapted to screw into a threaded bore 18 in crank 5 and be thereby forced into engagement with the end of bolt 12 to frictionally prevent the same from unscrewing. Preferably, bolt 12 is adapted to screw into shank 9 in a right-handed direction while cap 17 is adapted to screw into the crank in a left-handed direction, so that, should the bolt start to unscrew, the cap will have a tendency to screw further into the crank. The cap is provided with spanner holes 19 to facilitate its removal.

Tightly surrounding shanks 8 and 9 and extending from points near the cranks on each side is a sleeve 20 which is provided with inwardly projecting feathers 21 adapted to fit into grooves 22 cut in each of the shanks. These grooves and feathers are preferably two in number, although any other number may be employed, and are preferably placed diametrically opposite each other, fitting as tightly as is consistent with ease in dismounting the assembled parts. The ends of sleeve 20 bear against annular shoulders 23 on the shaft, and the parts are so proportioned to each other that the beveled ends of the shanks are forced tightly against each other when the ends of the sleeve fit tightly against the shoulders, the whole being held rigidly in this relation by bolt 12.

Sleeve 20 is adapted to rotate with the crank through the arrangement above explained and is provided with a pair of cones 24 which may be made integrally with the sleeve or may be mounted on the sleeve as a separate piece, the former construction being preferable. Immediately surrounding sleeve 20 is a circular case 25 which consists of two halves 26 and 27. Portion 27 of the case is adapted to screw into portion 26 as at 28, the threads being long enough to allow of ample adjustment in the length of the case as hereinafter described. Portion 26 is provided with an annular shoulder 29 adapted to engage with a locking ring 30 which is also in screw threaded engagement with the outside of portion 27 as at 31.

Rigidly mounted in each end of case 25 is an annular ball race 32 in which balls 33 are adapted to run. As will be seen in the drawings balls 33 are adapted to bear on cones 24, being held in engagement with the same by races 32. By adjusting the length of the case and setting locking ring 30 I am enabled to keep the balls in proper contact with the cones and races at all times. The locking of the case may also be accomplished by means of clamp bolts 34 on hanger box 35 of bicycle frame 36, the clamps holding the two halves of the case tightly against rotation.

From the foregoing description it will be observed that I have provided a crank hanger which is almost impossible to loosen or throw out of alinement by constant use and that the mechanism by which I accomplish this result is simple in construction and design. My crank hanger is further adapted to be easily taken apart and reassembled and is therefore suited to the needs of the ordinary user. It will further be seen that on account of the rigid construction employed and the spacing of the cones on a solid sleeve instead of on the two halves of the crank shaft, as is usually done, a construction is provided which is free from liability to become tight or loose on the bearings.

Having described my invention what I claim as new and desire to secure by Letters Patent is:—

1. In a device of the class described, a crank shaft divided obliquely into two sections; a sleeve rigidly keyed to both sections of said crank shaft; and means to hold the sections together.

2. In a device of the class described, a crank shaft divided into two sections on a transverse oblique plane through the center thereof; a bolt adapted to hold the two sections in rigid engagement with each other; a sleeve rigidly keyed to each of said sections; and bearings for said sleeve.

3. In a device of the class described, a crank shaft formed of two sections divided from each other along a transverse oblique plane; a longitudinal bolt adapted to secure said sections together; a sleeve fitting tightly over said sections and keyed to both of the same, said sleeve being provided with cones on each end thereof; a cylindrical case surrounding said sleeve, said case being provided with ball races at each end thereof; balls adapted to engage with said ball races and with the cones on said sleeve; and means to adjust the length of said case.

4. A device of the class described, comprising a crank shaft divided obliquely into two sections; a sleeve rigidly keyed to both sections; means to hold the sections together; cones for ball bearings mounted on said sleeve; an outer bearing having corresponding ball races therein; means to adjust the length of said outer sleeve; and means to lock the adjustment at any desired point.

5. In a crank hanger construction, a casing composed of two members in screw threaded engagement with each other, and means to rigidly lock the two said members together when in their adjusted position.

In witness that I claim the foregoing I have hereunto subscribed my name this 7th day of October, 1907.

DWIGHT B. STEPHENSON.

Witnesses:
IRVIN H. BARKELEW,
OLLIE PALMER.